United States Patent [19]

Robbins et al.

[11] Patent Number: 4,482,284

[45] Date of Patent: Nov. 13, 1984

[54] AUTOMATIC HAND RAIL

[75] Inventors: Bobbie L. Robbins; Gary L. Norton, both of Hutchinson, Kans.

[73] Assignee: Collins Industries, Inc., Hutchinson, Kans.

[21] Appl. No.: 313,389

[22] Filed: Oct. 21, 1981

[51] Int. Cl.³ ............................................. B60N 3/02
[52] U.S. Cl. .................................... 414/539; 14/69.5; 182/113; 414/921
[58] Field of Search ............... 414/539, 540, 545, 921; 14/69.5, 71.1; 182/113, 152, 83; 189/9 R

[56] References Cited

U.S. PATENT DOCUMENTS 3,727,721  4/1973  Kulesa ........................... 182/113 X
4,056,203  11/1977  Meldahl et al. ..................... 414/540
4,214,849  7/1980  Downing ............................ 414/545

OTHER PUBLICATIONS

Collins Industries, Inc. brochure Describing the Saf-T-Lift ®, Apr. 4, 1978.

Primary Examiner—Robert J. Spar
Assistant Examiner—Janice Krizek
Attorney, Agent, or Firm—Edwin H. Crabtree

[57] ABSTRACT

An improved retractable hand rail for mounting on a platform of a vehicle lift. The hand rail is folded on top of the platform when the platform is raised into a substantially vertical position in an opening in the vehicle. The hand rail is unfolded and extended upwardly on the platform when the platform is lowered into a horizontal position adjacent the opening of the vehicle. The hand rail provides the safety feature of allowing the user of the vehicle lift to grip the rail to maintain his balance during the use of the lift as it is raised and lowered adjacent the vehicle.

5 Claims, 7 Drawing Figures

AUTOMATIC HAND RAIL

BACKGROUND OF THE INVENTION

This invention relates generally to a hand rail and more particularly but not by way of limitation to a retractable hand rail for mounting on a vehicle lift. The vehicle lift is mounted in an opening in the vehicle and lowered from a substantially vertical position in the opening to a horizontal position adjacent the opening in the vehicle.

Heretofore, there have been various types of hand rails and particularly a retractable hand rail for a vehicle lift disclosed in U.S. Pat. No. 4,214,849 inventor Harold B. Downing and assigned to the assignee of interest of this application. The invention described in this application is a substantial improvement over the retractable hand rail described in the above mentioned patent.

Prior to the subject invention, none of the prior art vehicle lifts provided a novel retractable hand rail for mounting on a vehicle lift which will automatically lower and raise through the use of a control cam and receiver block as the platform of the lift is raised and lowered adjacent the vehicle.

SUMMARY OF THE INVENTION

The subject retractable hand rail for a vehicle lift provides the user of the vehicle lift a hand rail which may be gripped by a person on the platform as the vehicle lift is being operated or may be used by a disabled person in a wheelchair as the wheelchair is raised and lowered on the platform.

The retractable hand rail automatically folds and unfolds as the platform of the vehicle lift is raised into a substantially vertical position in the opening of the vehicle or when it is lowered into a horizontal position adjacent the opening of the vehicle.

The invention when folded on top of the platform when the lift is raised into a vertical position in the vehicle takes up little or no additional space in the vehicle.

The improved retractable hand rail is simple in design, rugged in construction and is readily adaptable for various types of vehicle lifts used on different types of vehicles for loading and unloading objects thereon or in handling of disabled persons in wheelchairs.

The hand rail is automatically operated by mechanical means and does no require or depend on a power source such as an electric motor, hydraulic pump or any other type of power source. Also it is virtually maintenance free.

The improved retractable hand rail eliminates the use of a pivot cable which heretofore was attached to one end of the lift with the other end of the cable attached to the hand rail.

The improved retractable hand rail for a vehicle lift includes a hand support for gripping by hand. The hand support is mounted on top of a first post. The first post is pivotally attached to a pivot shaft attached to the platform of the vehicle lift. The pivot shaft includes a coil-spring mounted thereon. The coil-spring engages the post and biases the post downwardly into a lowered position on top of the platform when the platform is raised from a horizontal position to a substantially vertical position in the door opening of the vehicle. Mounted on one end of the pivot shaft is a control cam. A receiver block is mounted on the lift. When the platform is lowered the control cam is received in the receiver block for raising the first post and the hand rail when the platform is lowered into a horizontal position.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
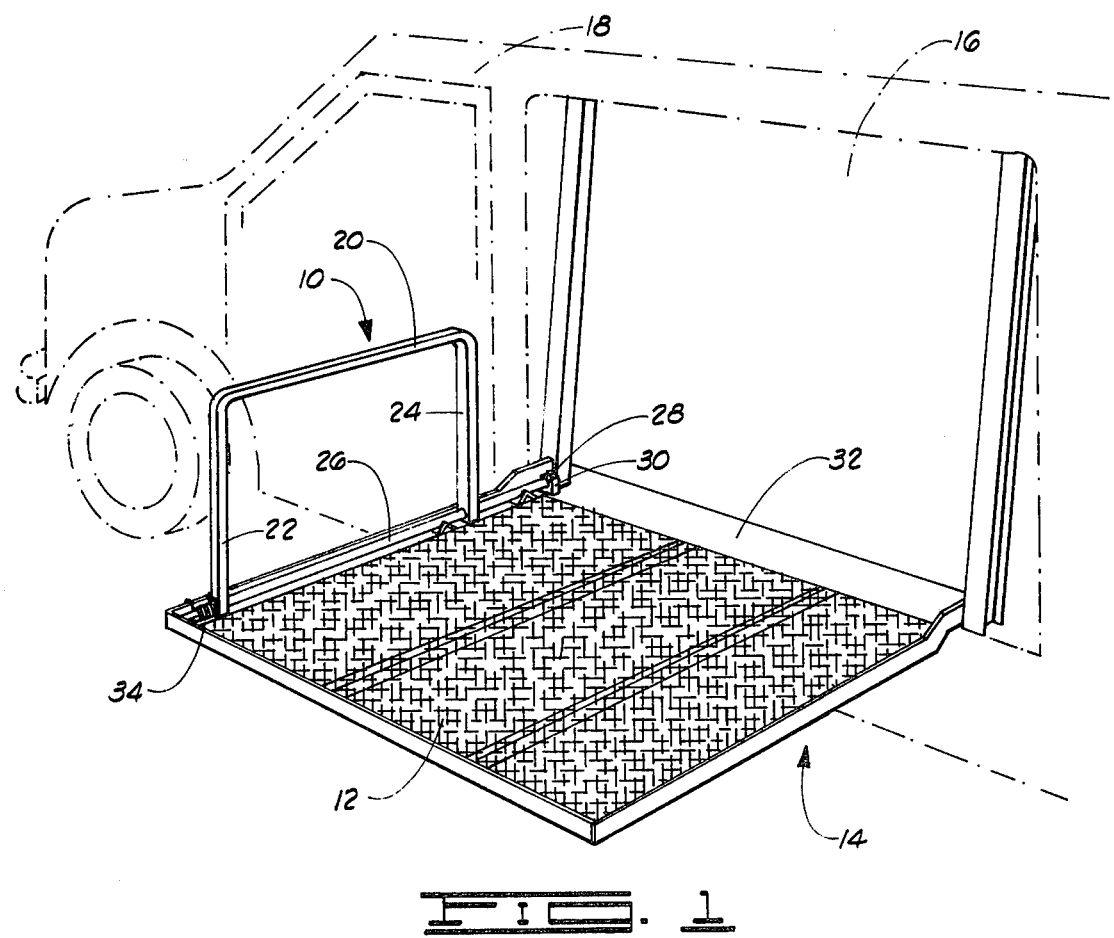
FIG. 1 is a perspective view of the improved retractable hand rail mounted on a platform of a vehicle lift disposed in an opening in the side of a vehicle.

In FIG. 1 the improved retractable hand rail is shown in a perspective view and designated by general reference numeral 10. The hand rail 10 is pivotally mounted on a platform 12 which is part of the overall structure of a vehicle lift 14. The lift 14 is mounted in an opening 16 of a vehicle 18. The lift 14 is used for loading objects thereon when the platform 12 is lowered into a horizontal position adjacent the opening 16 or in a position adjacent the ground surface.

The improved hand rail 10 includes a hand support 20 with both ends of the support 20 attached to the upper end portions of a first post 22 and a second post 24. The lower end portions of the first post 22 and second post 24 are attached to a pivot shaft 26 which is pivotally mounted on mounting brackets 27 shown more clearly in FIG. 5. The mounting brackets 27 are attached to the sides of the platform 12.

One end of the shaft 26 has a "V" shaped control cam 28 mounted thereon for receipt in a receiver block 30. The block 30 is mounted on top of a portion of a base plate 32 which is part of the lift 14. The other end of the shaft 26 has a coil spring 34 mounted therearound with one end of the spring 34 engaging the first post 22 and the other end attached to the side of the platform 12.

In FIG. 1 the platform 12 of the lift 14 is shown in a lowered horizontal position adjacent the opening 16 of the vehicle 18. In this position, the improved hand rail 10 has been raised in a fully extended position and ready for use as the platform 12 is raised and lowered adjacent the vehicle 18.

Figures 2, 3:
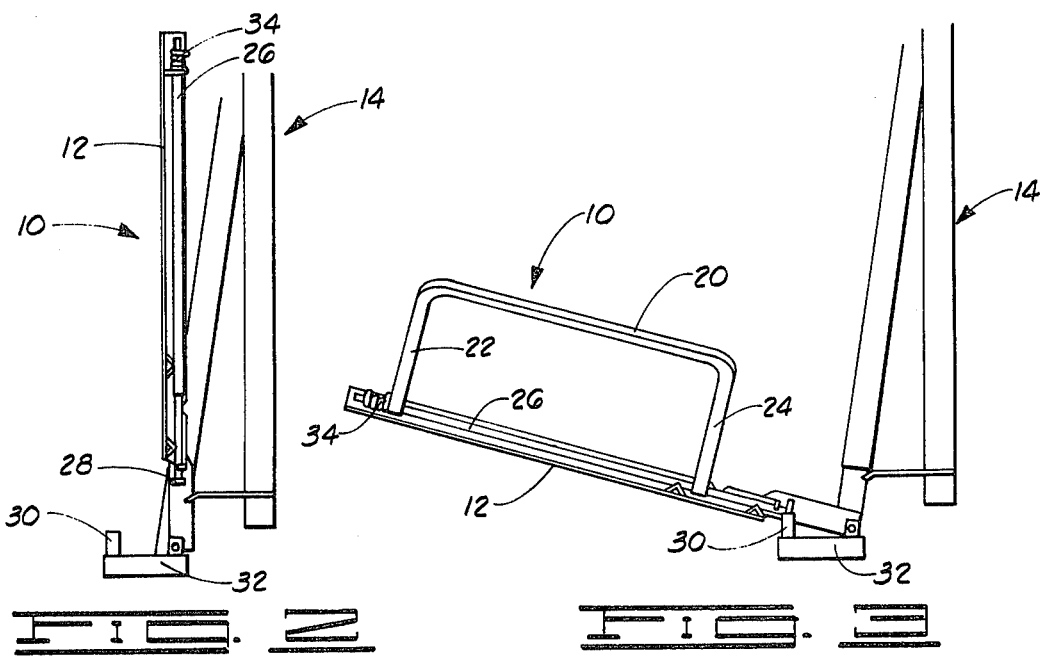
FIG. 2 is a side view of the improved retractable hand rail on top of the platform with the platform in a raised position.
FIG. 3 is a side view of the improved retractable hand rail and platform in a partially lowered position.

In FIG. 2 a side view of the hand rail 10 is shown with the platform 12 in a raised vertical position adjacent a portion of the lift 14. In this position the platform 12 and hand rail 10 are moved into the opening 16 of the vehicle 18 and stored therein when the platform 12 is not in use.

In FIG. 3 the lift 14 is in operation with the platform 12 in a partially lowered position. In this position the control cam 28 mounted on the end of the pivot shaft 26 has been partially received in the receiver block 30. As the control cam 28 rolls or slides into a "V" shaped opening in the top of the receiver block 30 as shown in FIG. 6 the biased force of the coil spring 34 is overcome and the pivot shaft 26 is rotated thereby raising the connected hand rail 10 above the top of the platform 12.

Figure 4:
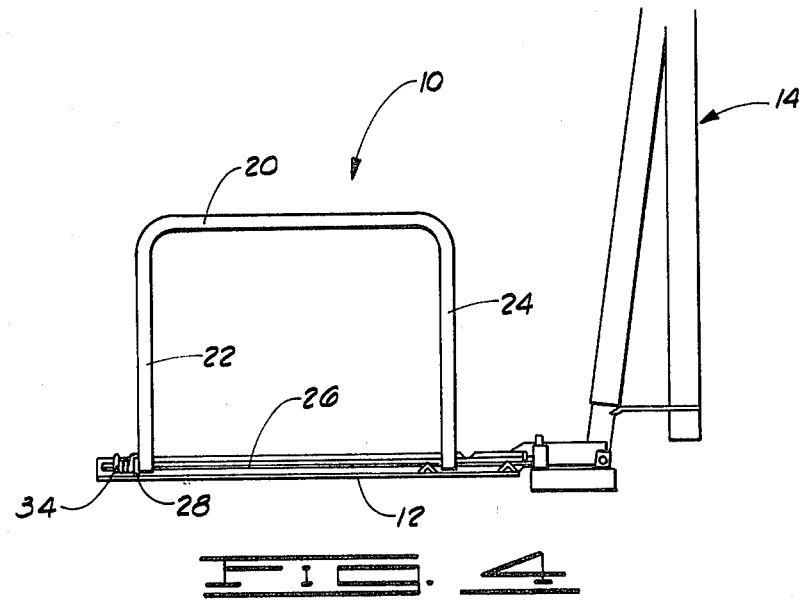
FIG. 4 is a side view of the platform lowered into a horizontal position with the improved hand rail raised in an extended position.

In FIG. 4 the improved hand rail 10 is shown in a completely extended or raised position above the platform 12 which now is in a horizontal position. It should be noted at this point, the control cam 28 has been completely received in the bottom of the opening in the top of the receiver block 30 and the pivot shaft 26 has raised the first post 22, second post 24 and hand support 20 into the fully extended position for use by the operator of the lift 14.

Figure 5:
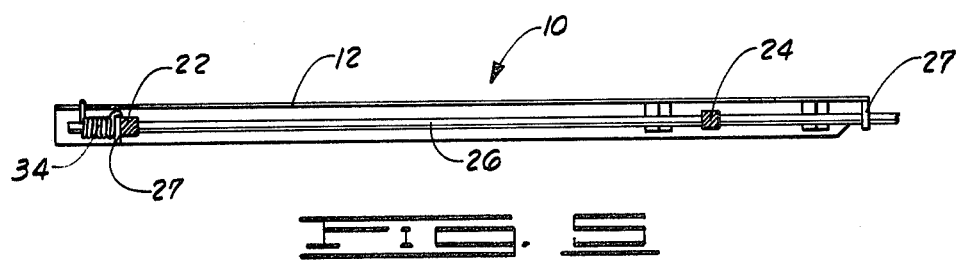
FIG. 5 is a top view of the pivot shaft mounted on the platform.

In FIG. 5 a top view of the pivot shaft 26 can be seen mounted on the side of the platform 12 with the first post 22 and second post 24 cut away. In this view, the coil spring 34 can be seen disposed around one end of the shaft 26 with the spring 34 engaging the first post 22 and the side of the platform 12.

Figures 6, 7:
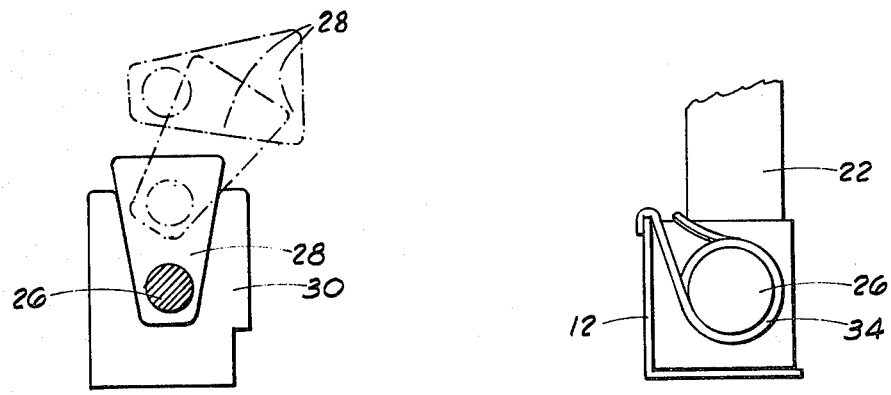
FIG. 6 is an enlarged view of the control cam shown received in the receiver block.
FIG. 7 is a side view of the coil-spring mounted on the pivot shaft and engaging the first post.

In FIG. 6 a front view of the receiver block 30 can be seen with the control cam 28 shown in dotted lines as it is received and rolled into the top of the "V" shaped receiver block 30. As the cam 28 is received and rolled in the receiver block 30 in turn the connected pivot shaft 26 is rotated thereby moving the hand rail 10 upwardly. The control cam 28 is shown in solid lines when completely received in the bottom of the receiver block 30 and the hand rail 10 is in a completely extended or raised position.

The control cam 28 shown in dotted lines in FIG. 6 and in a horizontal position is in this same horizontal position when the platform is in its raised vertical position as shown in FIG. 2. As the platform 12 is lowered, the cam 28, in turn, is lowered to a position directly above the receiver block 30. As the platform 12 continues to be lowered, the cam 28 is received in the receiver block 30 and begins to roll in a counter clockwise direction. The cam 28 is shown in dotted lines at an angle of approximately 45°. The shaft 26 connected to the cam 28, at the same time, has begun to raise the hand rail 10 as shown in FIG. 3. The cam 28 is shown in a vertical position and in solid lines when the platform 12 has been completely lowered. The cam 28 has now rotated 90° from its starting position in FIG. 2 and has rotated the shaft 26 allowing the hand rail 10 to be now in a completely raised position as shown in FIG. 4.

In FIG. 7 a front view of the coil spring 34 can be seen engaged around the pivot shaft 26 with one end of the coil spring 34 attached to the side of the platform 12 and the other end of the spring 34 engaging the first post 22 for biasing it in a clockwise direction and lowering the hand rail 10 when the control cam 28 becomes disengaged from the receiver block 30. This occurs when the platform 12 is raised in its vertical position adjacent the opening 16 of the vehicle 18 as shown in FIG. 2.

Changes may be made in the construction and arrangement of the parts of elements of the embodiments as described herein without departing from the spirit or scope of the invention defined in the following claims.

What is claimed is:

1. An improved retractable hand rail for a vehicle lift, the lift having a platform disposed substantially in a vertical position in a door opening of a vehicle, the platform used for loading objects thereon when the platform is lowered into a horizontal position adjacent the door opening or to a position adjacent the ground surface, the hand rail comprising:

a hand support for gripping when the platform is lowered into a horizontal position;
a first post having an upper end portion attached to the hand support and a lower end portion;
retraction means attached to the lower end portion of the first post and attached to the platform for lowering the hand support and first post on the platform when the platform is raised into a vertical position in the door opening;
a control cam mounted on the retraction means; and
a receiver block mounted on the lift, so that when the platform is lowered the control cam is received in the receiver block, and movement of the control cam into the receiver block causes the cam and the retraction means secured thereto to rotate relative to the platform, thereby raising the hand support and the first post upwardly above the platform when the platform is lowered into a horizontal position.

2. The hand rail as described in claim 1 wherein the retraction means is a pivot shaft attached to the platform and the lower end portion of the first post, the pivot shaft having a coil spring mounted thereon, the coil spring engaging the first post and biasing the first post downwardly into a lowered position on top of the platform when the control cam is disengaged from the receiver block.

3. The hand rail as described in claim 2 wherein the control cam is mounted on the end of the pivot shaft, the control cam received in the receiver block when the platform is lowered and rotating the pivot shaft thereby overcoming the bias force of the coil spring and raising the hand support and first post upwardly above the platform when the platform is lowered into a horizontal position.

4. The hand rail as described in claim 2 further including a second post having an upper end portion attached to one end of the hand support, the first post attached to the other end of the hand support, the lower end position of the second post pivotally mounted on the pivot shaft.

5. An improved retractable hand rail for a vehicle lift, the lift having a platform disposed substantially in a vertical position in door opening of a vehicle, the platform used for loading objects thereon when the platform is lowered into a horizontal position adjacent the door opening or to a position adjacent the ground surface, the hand rail comprising:

a hand support for gripping when the platform is lowered into a horizontal position;
a first post having an upper end portion attached to one end of the hand support and a lower end portion;
a second post having an upper end portion attached to the other end of the hand support and a lower end portion;
a pivot shaft attached to the platform and the lower end portions of the first post and the second post, the pivot shaft having a coil spring mounted thereon, the coil spring engaging the first post for biasing the posts and hand support downwardly into a lowered position on top of the platform;
a control cam mounted on one end of the pivot shaft; and
a receiver block mounted on the lift, so that when the platform is lowered the control cam is received and rotated in the receiver block, and movement of the control cam into the receiver block causes the cam and the pivot shaft secured thereto to rotate relative to said platform, thereby raising the hand support and the first and second post upwardly when the platform is lowered into a horizontal position.

* * * * *